United States Patent [19]

Laatsch

[11] 3,754,709

[45] Aug. 28, 1973

[54] HOSE NOZZLE WITH DISCHARGE CONTROL

[75] Inventor: Kurt A. Laatsch, La Puente, Calif.

[73] Assignee: Joseph R. Battieger, La Mirada, Calif. ; a part interest

[22] Filed: Sept. 20, 1971

[21] Appl. No.: 181,662

[52] U.S. Cl. .................. 239/530, 239/571, 137/218
[51] Int. Cl. ......... B05b 9/08, B05b 1/30, E03c 1/10
[58] Field of Search.................... 239/530, 569, 571, 239/583; 137/218; 251/35, 41

[56] References Cited
UNITED STATES PATENTS

| | | | |
|---|---|---|---|
| 3,637,143 | 1/1972 | Shomes et al. | 239/530 X |
| 2,598,002 | 5/1952 | Langdon | 137/218 |
| 3,536,294 | 10/1970 | Rodriguez | 251/41 |
| 2,740,604 | 4/1956 | Swigart et al. | 251/35 X |
| 2,876,981 | 3/1959 | McNown | 251/41 |
| 3,125,114 | 3/1964 | Langdon | 137/218 |
| 3,155,107 | 11/1964 | Woodford | 137/218 |
| 3,334,646 | 8/1967 | Billeter et al. | 137/218 |

FOREIGN PATENTS OR APPLICATIONS 886,398 8/1953 Germany .......................... 239/530

*Primary Examiner*—Robert S. Ward, Jr.
*Attorney*—Jess M. Roberts

[57] ABSTRACT

In a device to wash bedpans in a hospital, an inlet end of a hose is connected to a pressured water supply and the outlet end of the hose is equipped with both a discharge nozzle and manual means for control of the discharge from the nozzle. The inlet end of the hose is equipped with a check valve and anti-syphon means upstream from the check valve.

27 Claims, 14 Drawing Figures

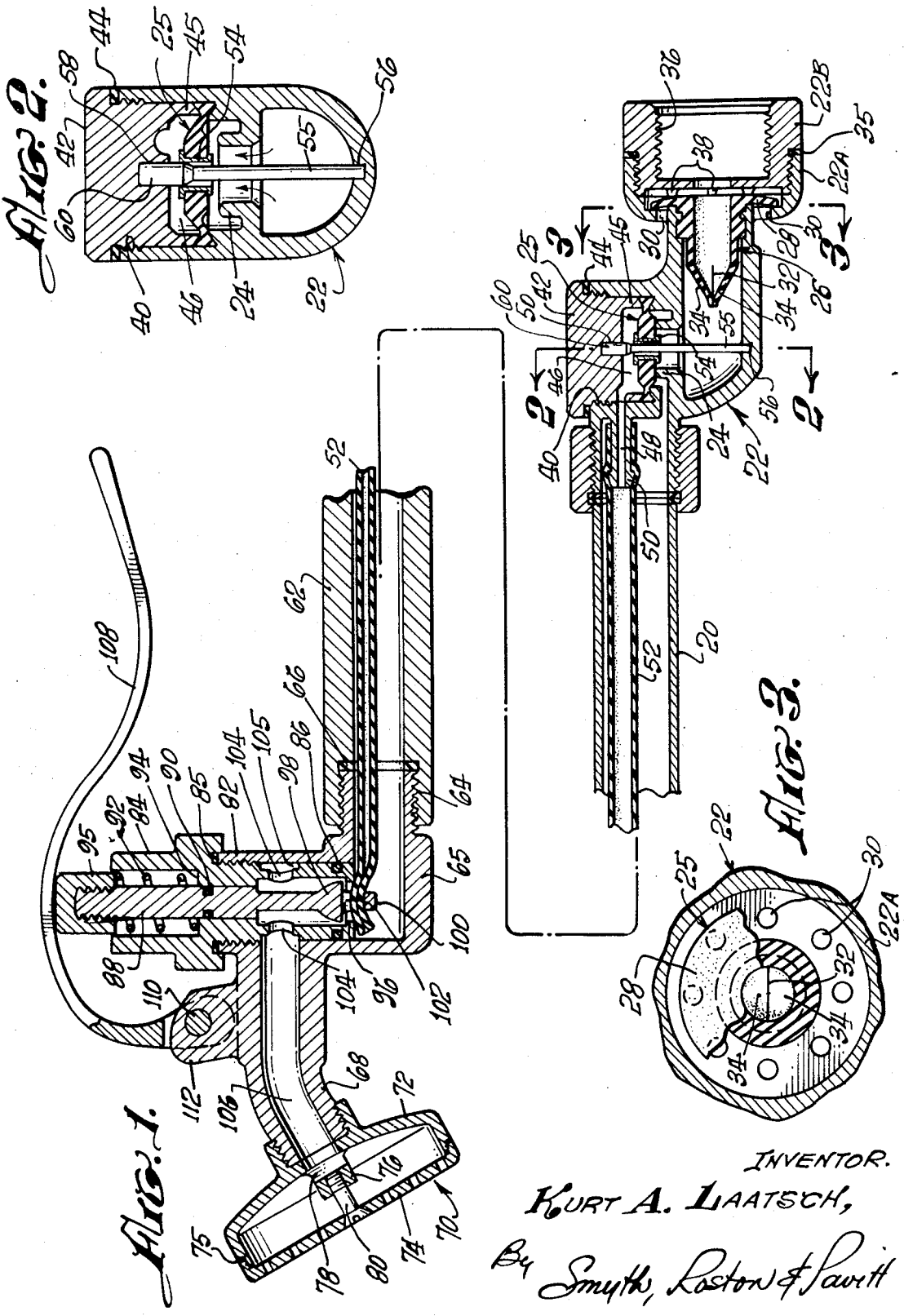

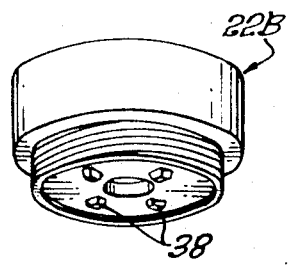
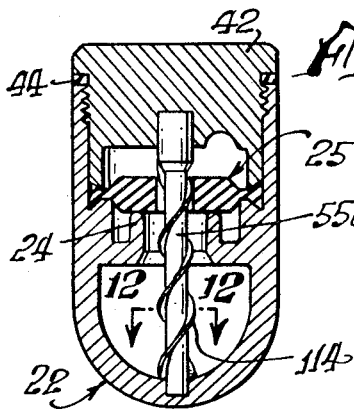
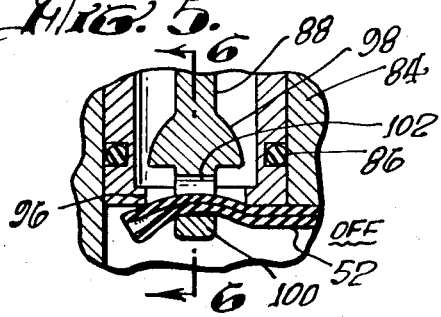
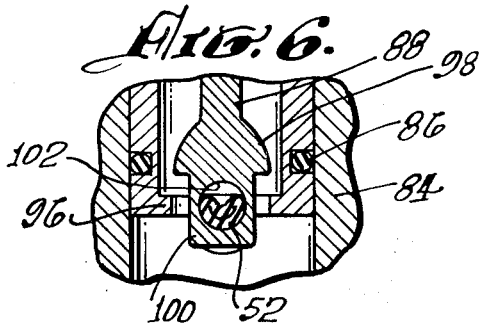
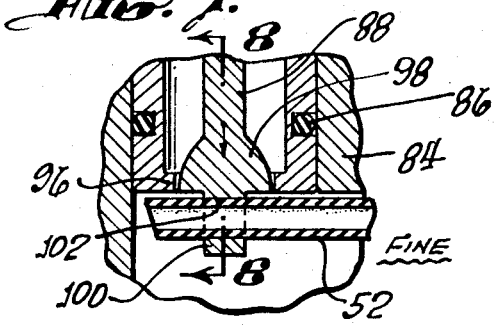
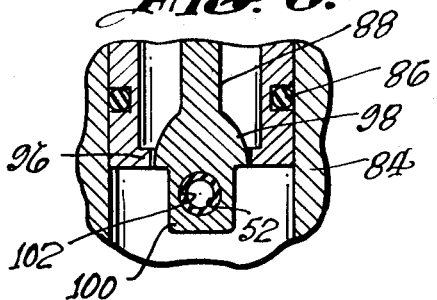
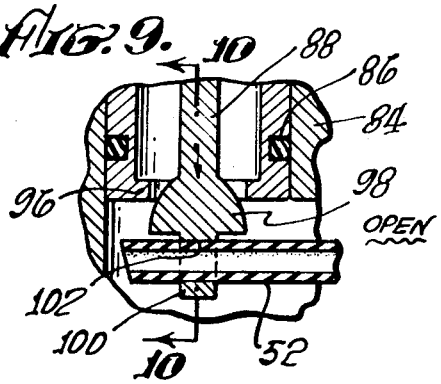
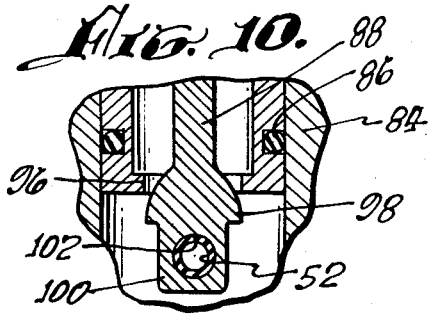

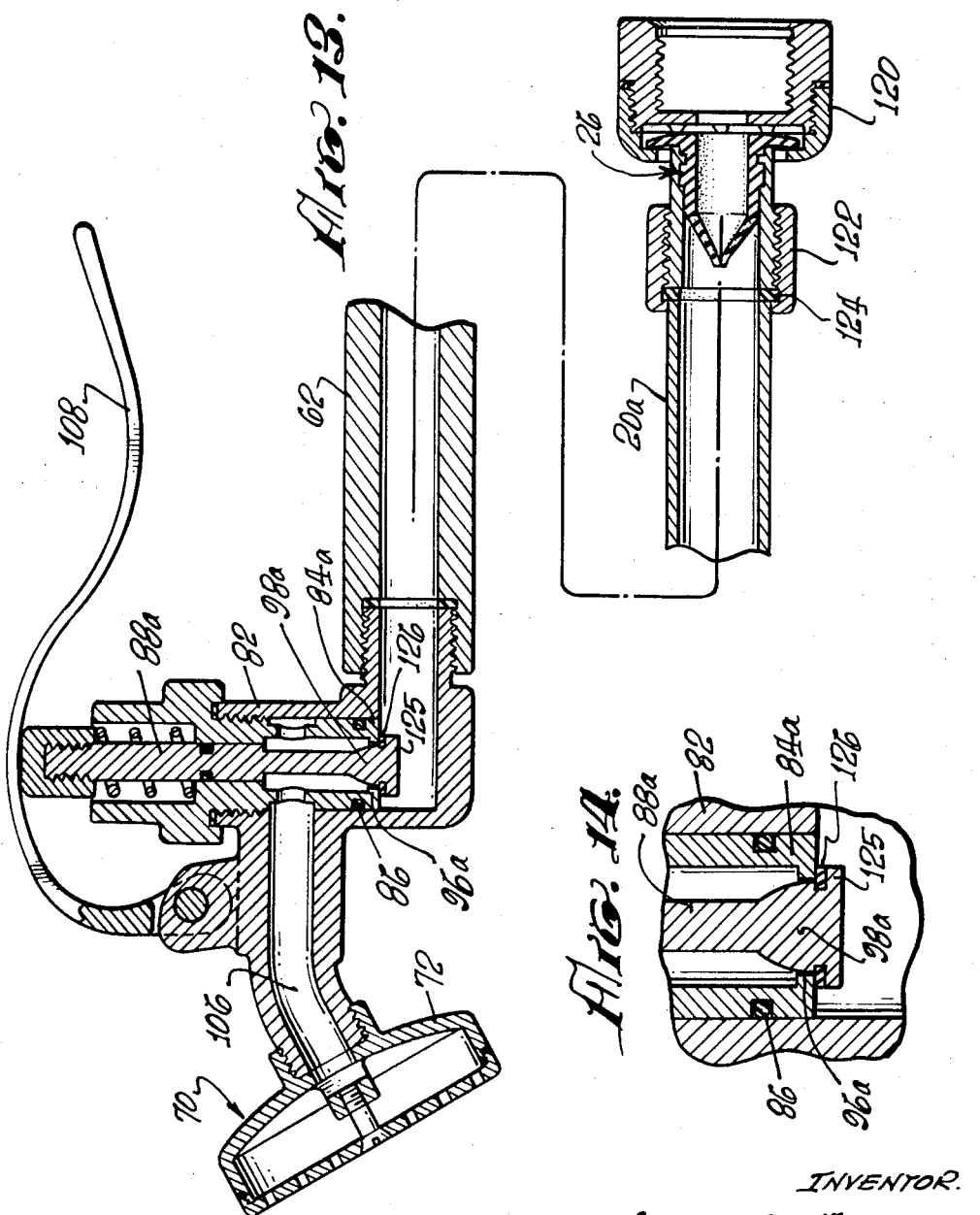

HOSE NOZZLE WITH DISCHARGE CONTROL

SUMMARY OF THE INVENTION

The broad object of the invention is to combine a nozzle on the outlet end of a hose with a handle that can be squeezed for control of the rate of fluid flow from the nozzle. Thus, only one hand is required both for maneuvering the nozzle and for controlling the discharge flow from the nozzle.

The invention is specifically described herein as embodied for the specific purpose of cleaning bedpans in a hospital, such a disclosure providing adequate guidance for those skilled in the art who may have occasion to apply the invention to other specific purposes in other fields.

In the first embodiment of the invention, the inlet end of a flexible hose is connected to a pressurized water supply by an elevated inlet valve and a suitable vacuum breaker is provided to prevent reverse flow from the hose through the valve. The outlet end of the hose is provided both with a spray nozzle and a handle that may be squeezed for remote control of the elevated valve. For the purpose of such remote control, suitable flexible means extending along the hose is operatively connected both to the handle and to the remote valve. In this regard a feature of the invention is a concept of placing the flexible means out of the way inside the hose itself.

Within the broad concept of the invention, various types of valves may be employed at the elevated inlet end of the hose, including solenoid valves and valves mechanically operated by cables. A feature of the first embodiment of the invention, however, is the concept of employing a remote valve that is actuated by the pressure of the water supply and is controlled by a bleeder tube. The bleeder tube extends from the inlet valve to the handle on the nozzle for control by the handle. The handle normally cuts off flow through the bleeder tube to keep the remote valve closed and squeezing the handle in opposition to spring pressure opens the bleeder tube to open the remote valve.

One feature of this first embodiment of the invention is the concept of incorporating a second valve in the nozzle to regulate the discharge from the nozzle, this second valve being also controlled by the handle on the nozzle. It is contemplated that the handle will have a range of three positions, namely: a normal position with the handle relaxed; a first-advanced open position with the handle under moderate squeeze pressure; and a second-further advanced maximum open position under greater squeeze pressure. At the normal released position of the handle, the bleeder tube is squeezed shut to keep the remote inlet valve closed but the second valve at the nozzle is open for free drainage of residual fluid from the hose. At the first-advanced open position of the handle, the bleeder tube is open to open the remote inlet valve, but the second valve is partially closed to restrict discharge from the nozzle. As the handle is advanced from the second open position to the maximum open position, the bleeder tube remains open to keep the remote inlet valve open and the second valve progressively opens to permit progressively increased discharge of the pressurized fluid from the nozzle.

The elevated inlet valve incorporates a control chamber, one wall of which is a diaphragm. When the control chamber is under pressure from the pressurized fluid source, the diaphragm is pressed against a valve seat to cut off flow through the inlet valve. To open the inlet valve, the pressure in the control chamber is reduced by bleeding off fluid therefrom to retract the diaphragm from the valve seat. Bleeder flow from the control chamber is through the previously mentioned bleeder tube that extends to the handle at the nozzle. Flow communication to the control chamber for closing the diaphragm against the valve seat is through an aperture in the diaphragm and a pin extends through the aperture so that relative movement between the diaphragm and the pin prevents clogging of the aperture. The portion of the pin that registers with the aperture in the diaphragm at the closed position of the diaphragm is of relatively small diameter for relatively free flow of pressurized fluid through the aperture into the control chamber. Another portion of the pin cooperates with the aperture at the retracted or open position of the diaphragm and this second portion of the pin is of larger diameter to greatly restrict the flow of pressurized fluid through the aperture into the control chamber when the bleeder tube is open.

A feature of the invention is the concept of lining the aperture of the diaphragm with a sleeve or spool of a plastic material that resists adherence thereto of precipitates from water. Such a sleeve may, for example, be made of Teflon or the like.

Instead of lining the aperture in the diaphragm with plastic material, clogging of the aperture may be prevented by rotating the pin. For this purpose the pin may be free to rotate on its longitudinal axis and may be provided with vane means that has two functions. One function of the vane means is to cause the pin to rotate in reaction to water flow through the diaphragm aperture. The other function of the vane means is to scrape away any deposits of precipitated material that may tend to clog the aperture in the diaphragm.

A second embodiment of the invention differs from the first embodiment in that the remotely controlled inlet valve is omitted. Both embodiments have the combination of check valve and anti-syphon means for effective prevention of contamination of the water supply.

The various features and advantages of the invention may be understood from the following detailed description and the accompanying drawings.

BRIEF DESCRIPTION OF THE DRAWINGS

FIG. 1 is a longitudinal or axial sectional view of the presently preferred embodiment of the invention showing the inlet valve at the inlet end of the hose and showing the nozzle with the manual control at the outlet end of the hose;

FIG. 2 is a transverse section along the line 2—2 of FIG. 1 showing the inlet valve open instead of closed;

FIG. 3 is a transverse section along the line 3—3 of FIG. 1 showing the construction of a vacuum breaker that is associated with the inlet valve;

FIG. 4 is a perspective view of a removable screw-threaded plug that normally anchors an elastomer member of a a vacuum breaker and which may be removed for access to the vacuum breaker;

FIG. 5 is an enlarged portion of FIG. 1 showing the second valve in its normal retracted position with the end of the bleeder tube squeezed shut;

FIG. 6 is a fragmentary section taken as indicated by the line 6—6 of FIG. 5;

FIG. 7 is a view similar to FIG. 5 showing the second valve advanced to its second position at which it restricts the flow from the nozzle to a rate to produce a gentle spray, the bleeder tube being open to keep the inlet valve open;

FIG. 8 is a fragmentary section along the line 8—8 of FIG. 7;

FIG. 9 is a view similar to FIGS. 5 and 7 showing the second valve advanced to a wide-open position for maximum flow from the spray nozzle;

FIG. 10 is a section along the line 10—10 of FIG. 9;

FIG. 11 is a sectional view similar to FIG. 2 illustrating a modification of the invention;

FIG. 12 is a transverse section along the line 12—12 of FIG. 11;

FIG. 13 is a view similar to FIG. 1 showing a second embodiment of the invention that eliminates the remotely controlled inlet valve; and FIG. 14 is an enlarged fragment of FIG. 13.

DESCRIPTION OF THE PREFERRED EMBODIMENT OF THE INVENTION

Referring to FIG. 1 a hose 20 is connected at its inlet end to a fitting 22 that incorporates an inlet valve which has an annular valve seat 24 and a rubber-like diaphragm 25 that cooperates with the valve seat to control flow through the valve. The fitting 22 further includes a check valve, generally designated 26, made of elastomer which has a circumferential radial flange 28 that normally closes a series of vent apertures 30 (FIG. 3) in the fitting to serve as a vacuum breaker or anti-syphon device. Whenever a vacuum is created upstream from the flange 28, the flange 28 flexes to uncover the vent apertures to admit atmospheric air to break the vacuum and thus prevent any possibility of reverse-flow through the hose 20. The elastomer check valve 26 has a hollow conical end portion which points downstream and which is split along the line 32 to form two cooperating lips 34 which are biased to press together to prevent reverse-flow through the fitting 22.

The fitting 22 is made into two sections 22A and 22B which screw together and are sealed by a sealing ring 35. The section 22A has the vent apertures 30 and the section 22B has an internal screw thread 36 by means of which it can be connected to a pipe (not shown) of a pressurized water system. As shown in perspective in FIG. 4, the section 22B is formed with a series of spaced lugs 38 which as shown in FIG. 1 press against the base of the rubber-like flange 28 of the check valve 26 to clamp the check valve in its assembled position. It is apparent that the section 22A may be unscrewed from the section 22B for access to the check valve 26 and to permit the check valve to be replaced.

The diaphragm 25 faces a radial opening 40 in the fitting 22 which is closed by a screw-threaded plug 42 and sealed by a sealing ring 44. The plug 42 has a cylindrical skirt 45 which cooperates with the fitting 22 to retain the diaphragm 25 by pinching or clamping the periphery of the diaphragm. The diaphragm 25 is a movable wall of a control chamber 46 which has a bleeder passage 48 that extends through a small nipple portion 50 of the fitting 22. This bleeder passage is continued by a flexible bleeder tube 52 of rubber-like material which is telescoped over the nipple 50.

The diaphragm 25 has a central aperture within the area of the annular valve seat 24 to admit high-pressure fluid into the control chamber 46 and in the preferred embodiment of the invention this aperture is lined by a sleeve or spool 54 of a suitable material to which precipitates from water do not tend to adhere. For example, this sleeve 54 may be made of Teflon or the like.

In a well-known manner, high pressure fluid from the upstream side of the valve seat 24 may flow into the control chamber 46 through the aperture in the diaphragm 25 and if the bleeder passage 48 is cut off, or at least drastically restricted, the consequent rise in fluid pressure in the control chamber 46 forces the diaphragm 25 against the annular valve seat 24 to cut off the flow of the pressurized fluid into the hose 20. On the other hand, if the freedom for flow through the bleeder passage 48 and the flexible bleeder tube 52 substantially exceeds the rate of flow through the central aperture of the diaphragm 25, the pressure in the control chamber 46 drops sufficiently to cause the fluid pressure inside the annular valve seat 24 to push the diaphragm away from the valve seat to permit free flow of fluid through the inlet valve into the hose 20.

A suitable pin 55 extends through the plastic spool 54 of the diaphragm 25 with one end of the pin seated in a socket 56 in the fitting 22 and the other end of the pin seated in a socket 58 in the plug 42. As may be seen in FIG. 1, the portion of the pin 55 that registers with the aperture or sleeve 54 in the diaphragm 25 is of relatively small diameter to permit ample flow of high-pressure fluid into the control chamber 46 to keep the diaphragm in its closed position so long as flow is restricted through the bleeder passage 48 and the bleeder tube 52. As shown in FIG. 2, however, the pin 55 has a portion 60 of larger diameter that cooperates with the diaphragm aperture or plastic sleeve 54 to drastically reduce the freedom for flow or high pressure fluid into the control chamber 46 when the bleeder passage is open to keep the inlet valve open.

The outlet end of the hose 20 is continued by a rigid tube 62 which may be attached to the hose in any suitable manner (not shown). The outlet end of the rigid tube 62 has an internal screw thread to receive a threaded nipple portion 64 of a rigid nozzle body 65 with the joint sealed by a suitable sealing ring 66. The nozzle body 65 has a forward nipple portion 68 which is screw-threadedly engaged by a spray head, generally designated 70. The spray head 70 comprises a bowl 72 and a removable perforated disc 74, the joint between the bowl and the disc being sealed by a sealing ring 75. In the construction shown, the bowl 72 is formed with an inner axial projection 76 which has radial ports 78 for fluid flow from the nipple portion 68 into the spray head and the perforated disc 74 is held in position by an axial screw 80 that threads into the projection.

The nozzle body 65 has an upwardly extending nipple portion 82 with a sleeve 84 seated in the nipple portion, the sleeve being sealed by an O-ring 85 at the rim of the nipple and being sealed by an O-ring 86 near the lower end of the sleeve. A plunger 88 that carries an O-ring 90 is slidingly mounted in the sleeve 84 and is biased outward by a coil spring 92 that acts under compression between an inner circumferential shoulder 94 of the sleeve and a cap 95 that is screwed onto the outer end of the plunger.

The inner end of the sleeve 84 has a valve seat 96 in the form of an inner circumferential flange which is the valve seat of the previously mentioned second valve. The plunger 88 is formed with an enlargement 98 to serve as a valve member in cooperation with the valve seat 96 and the plunger is further formed with an axial projection 100 which is formed with a transverse aperture 102 to receive the end portion of the flexible bleeder tube 52. Water from the interior of the hose 20 flows upward into the sleeve 84 around the lower end of the plunger 88 and flows radially outwardly through ports 104 of the sleeve into a circumferential groove 105 of the sleeve that registers with an axial passage 106 that leads to the nozzle head 72.

The required manual operating means for the nozzle is in the form of a double-curved handle 108 that extends across the top of the plunger cap 95 and is pivotally connected to the nozzle by a transverse pin 110. The forward end of the handle 108 is forked to straddle a small wing 112 of the nozzle and the pin 110 extends through the wing and the forked end of the lever.

It is apparent that the operator of the nozzle may grasp the handle 108 together with the rigid tube 62 of the nozzle and by squeezing action may swing the lever 108 against the resistance of the coil spring 92 to shift the auxiliary valve member 98 downward to any desired degree.

At the normal relaxed position of the handle 108 shown in FIG. 1 the flexible bleed tube 52 is pinched shut by the aperture of projection 100 pulling the end portion of the flexible bleeder tube against the inner end of the sleeve 84. Since the bleeder tube 52 is cut off in this manner the inlet valve is closed by the buildup of pressure in the control chamber 46. At this time, the valve member 98 is slightly retracted from the valve seat 96 to permit any fluid in the hose to drain freely to the nozzle head 72. Thus, the retracted position of the valve member 98 destroys any back pressure that may exist in the hose 20 when the handle 108 is released to cause the inlet valve to close. The normal retracted position of the valve head 98 and the manner in which the flexible bleeder tube 52 is pinched shut is shown in the enlarged sectional views FIGS. 5 and 6.

When the operator depresses the handle 108 to place the device in operation, he may depress the handle moderately to produce a moderate spray of water or he may depress the handle completely for a maximum rate of discharge from the spray head. If the operator depresses the handle only to the extent of positioning the valve member 98 in register with the valve seat 96 as shown in FIGS. 7 and 8, the water flowing to the spray head is restricted to the amount of water that can pass through the annular clearance between the valve member 98 and the surrounding valve seat 96, the result being that the water issues from the nozzle as a moderate and rather gentle spray. Advancing the auxiliary valve member 98 from the position shown in FIGS. 5 and 6 to the position shown in FIGS. 7 and 8 releases the flexible bleeder tube from the pinching action to permit maximum flow through the bleeder tube and thus cause the remote inlet valve to open.

If the operator desires to increase the force and velocity of the spray he depresses the handle 108 to the maximum by squeezing action to advance the valve member 98 from the position shown in FIGS. 7 and 8 to the position shown in FIGS. 9 and 10, the valve member being then advanced well beyond the valve seat 96 for maximum flow of water through the valve seat. It is to be noted that the valve member 98 is rounded and nearly spherically curved on its rear side and therefore progressively shifting the auxiliary valve member 98 from the position shown in FIGS. 7 and 8 to the position shown in FIGS. 9 and 10 results in a progressive increase in the rate of flow through the valve seat instead of an abrupt rise in the rate of flow. Thus the operator may regulate the spray in a progressive manner.

FIGS. 11 and 12 illustrate a modification of the first embodiment in which the sleeve or spool is omitted from the aperture in the diaphragm and in which a pin 55a is substituted for the pin 55. The pin 55a is free to rotate on its axis and is provided with helical vanes 114 that not only cause the pin to rotate in reaction to water flow but also mechanically clean the surrounding inner surface of the diaphragm aperture.

The second embodiment of the invention shown in FIGS. 13 and 14 is largely similar to the first embodiment, as indicated by corresponding numerals to designate corresponding parts. The essential difference is that the inlet valve and its remote control are omitted and a valve in the nozzle is capable of turning off the water flow as well as being capable of regulating the discharge from the nozzle.

The inlet end of the hose 20a is connected to a fitting 120 in a fluid tight manner by a bushing 122 and a sealing ring 124. In the manner previously described the fitting 120 is made in two parts to releasably grip a radial flange 28 of a hollow rubber-like check valve 26, with the flange overlying vent apertures 30 in the fitting wall.

The valve that is incorporated in the nozzle is largely of the same construction as the valve in the nozzle of the first embodiment. In this instance, however, the valve member 98a on the plunger 88a has a radial flange 125 which is on the upstream side of the valve seat 96a and is provided with a rubber-like washer 126 for sealing contact with the valve seat.

Normally the handle 108 is relaxed with the valve closed. Operating the handle opens the valve with the discharge flow varying with the movement of the handle.

My description in specific detail of the selected embodiments of the invention will suggest various changes, substitutions, and other departures from my disclosure within the spirit and scope of the appended claims.

I claim:

1. A device having in combination:
    a conduit, one end of the conduit being an inlet end for connection to a source of pressurized fluid, the other end being the outlet end
    a discharge nozzle on the outlet end of the conduit to be gripped by one hand of an operator,
    a check valve in the conduit to prevent reverse flow therein,
    means upstream from the check valve to vent the conduit to the atmosphere in response to the creation of a vacuum in the conduit;
    a valve in the nozzle to regulate discharge of the fluid from the nozzle,
    manual control means on the nozzle to actuate said valve, said manual control means being operable by the operator's hand that grips the nozzle,
    inlet valve means adjacent the inlet end of the conduit to control flow of pressurized fluid into the conduit including
    means for controlling said inlet valve by said manual control means, and bleeder means interconnecting said nozzle and said inlet valve means for controlling the opening of the latter.

2. A fluid discharge control device comprising
a nozzle,
a conduit upon which said nozzle is fixed against removal therefrom,
a first valve in said nozzle for regulation of the pressure of fluid passing through said nozzle,
a second valve in said conduit for selectively shutting off the flow of fluid through said conduit to said nozzle,
a third valve for prohibiting the reverse flow of fluid from said nozzle to a source of supply to which said conduit is attached, and
means interconnecting said first and second valves so that said second valve is opened by manual actuation of said first valve.

3. A fluid discharge control device comprising
a conduit having
means for attachment to a source of pressurized fluid at one end thereof and
a nozzle at the other end thereof,
means for prohibiting flow of fluid through said conduit in either direction,
means for regulating the flow of fluid discharged through said nozzle, and
means, interconnecting said flow regulating means and said flow prohibiting means, for selectively actuating said flow prohibiting means to allow fluid flow through said conduit only from the source toward the nozzle when said flow regulating means is manually actuated.

4. The device of claim 3 wherein
said flow prohibiting means includes
a pressure-actuated valve means and
said interconnecting means comprises
bleed-off means for relieving pressure which closes said valve means.

5. The device of claim 4 wherein
said flow prohibiting means also includes
check valve means for positively prohibiting flow of fluid toward said attachment means from said nozzle.

6. The device of claim 3 wherein
said flow regulating means comprises
valve means including
a valve seat and
a substantially spherical valve spool which cooperates with said valve seat to produce a progressive increase in the rate of fluid flow as said regulating means is progressively manually actuated.

7. A device having in combination:
a conduit, one end of the conduit being an inlet end for connection to a source of pressurized fluid, the other end being the outlet end;
a discharge nozzle on the outlet end of the conduit, a substantial portion of the conduit being flexible to permit the nozzle to be freely maneuvered;
an inlet valve near the inlet end of the conduit to control flow of the pressurized fluid into the conduit;
manual control means at the outlet end of the conduit; and
flexible means extending along the conduit operatively connected to said inlet valve and said manual control means for operation of the inlet valve by the manual control means.

8. A combination as set forth in claim 7 in which said flexible means is inside the conduit.

9. A combination as set forth in claim 7 in which said inlet valve is a fluid-pressure-actuated valve;
in which said flexible means is a bleeder tube in fluid communication with the inlet valve for actuation thereof; and
in which said control means controls fluid communication through the bleeder tube.

10. A combination as set forth in claim 9 in which said flexible bleeder tube is inside the conduit.

11. A combination as set forth in claim 7 which includes a second valve at the outlet end of the conduit to regulate the release of fluid from the conduit,
said second valve being responsive to said manual control means for operation thereby.

12. A combination as set forth in claim 11 in which said inlet valve is a fluid-pressure-actuated valve controlled by bleeder action;
in which said flexible means is a bleeder tube in fluid communication with the valve for actuation thereof; and
in which said manual control means controls fluid communication through the bleeder tube.

13. A combination as set forth in claim 12 in which said manual control means is operable to advance from a normal first position to a second position and from the second position to a third position;
in which said bleeder tube is closed at the normal first position of the manual control means and is open at the second and third positions of the manual control means; and
in which said second valve is partially closed at the second position of the manual control means and is open at the first and third positions of the manual control means,
whereby advancing the manual control means from its normal first position to its second position opens the flexible bleeder tube to open the inlet valve and partially closes the second valve for reduced fluid flow through the nozzle and advancing the manual control means from its second position to its third position keeps the inlet valve open and opens the second valve for maximum flow through the nozzle, and returning the manual control means to its normal first position closes the bleeder tube to close the inlet valve and opens the second valve for drainage of residual fluid from the conduit through the nozzle.

14. A combination as set forth in claim 13 in which said second valve includes a valve seat member and includes a valve member operated by the manual control means,
said valve member being movable through the valve seat member fron one side of the valve seat member at the normal first position of the master control means to the other side of of the valve seat member at the third position of the manual control means, the valve member registering with the valve seat member to restrict flow through the valve seat member at the second position of the manual control means.

15. A combination as set forth in claim 13 which includes means to pinch the flexible tube in response to return of the manual control means to its first position.

16. A combination as set forth in claim 15 in which said valve member has a projection that extends through the valve seat member at the normal first position of the master control means, said projection engaging the flexible hose and pinching the flexible hose shut at the normal first position of the manual control means.

17. A combination as set forth in claim 16 in which said projection embraces an end portion of the flexible tube and cooperates with the valve seat member to pinch the flexible tube at the normal retracted postion of the manual control means.

18. A combination as set forth in claim 7 which includes anti-syphon means at the inlet end of the conduit; and which includes a check valve at the inlet end of the conduit to prevent reverse flow through the conduit.

19. A combination as set forth in claim 18 in which the check valve has a hollow conical portion of elastomer pointing in the direction of normal fluid flow through the conduit, said conduit portion being split into two confronting tapered lips that are biased to close together.

20. A combination as set forth in claim 19 in which the anti-syphon means comprises a radial flange of the check valve; and in which the radial flange lies against and normally closes at least one vent port in the wall of the conduit and closes the vent port or ports in response to the creation of a vacuum on the upstream side of the check valve.

21. A combination as set forth in Claim 7 in which said inlet valve includes:
a valve seat;
a pressure chamber having a pressure-responsive movable wall cooperative with the valve seat to control flow through the valve;
means to place said chamber in communication with the upstream side of the valve seat to create pressure in the chamber to force the movable wall against the valve seat to cut off flow through the valve;
said flexible means for operation of the valve by remote control being in the form of a bleeder tube communicating with said chamber to release pressure from the chamber to cause the movable wall to retract from the valve seat;
said manual control being operative to open and close the bleeder tube.

22. A combination as set forth in claim 21 in which the movable wall is a flexible diaphragm.

23. A combination as set forth in claim 22 in which the means to place the chamber in communication with the upstream side of the valve seat comprises a port in the diaphragm; and in which the port is lined with a type of material to which precipitates from the fluid are substantially non-adherent.

24. A combination as set forth in claim 21 in which the means to place the chamber in communication with the upstream side of the valve seat comprises a port in the diaphragm; and which includes a pin extending through the port to dislodge foreign material from the port in response to relative movement between the diaphragm and pin.

25. A combination as set forth in claim 24 in which the pin is free to rotate; and in which the pin has surfaces to cause the pin to be rotated by fluid flowing through the port along the pin, the pin being of a configuration to clean the port by its rotation.

26. A combination as set forth in claim 25 in which the pin has vanes extending through the port for the dual purpose of causing the pin to be rotated by the flowing fluid and of cleaning the port in response to the rotation of the pin.

27. A combination as set forth in claim 24 in which the portion of the pin that cooperates with the port when the diaphragm is in its closed position against the valve seat is of relatively small diameter for ample fluid flow through the port; and in which the portion of the pin that cooperates with the port when the diaphragm is at its open position spaced from the valve seat is of larger diameter to reduce fluid flow through the port.

* * * * *